United States Patent

Niven, Jr.

[15] 3,693,029

[45] Sept. 19, 1972

[54] ELECTRICAL COMPENSATION CIRCUIT UTILIZING TWO TRANSISTORS CONNECTED IN PARALLEL

[72] Inventor: Francis J. Niven, Jr., 7807 Meadowcroft, Houston, Tex. 77042

[22] Filed: June 26, 1970

[21] Appl. No.: 59,861

Related U.S. Application Data

[62] Division of Ser. No. 684,849, Nov. 21, 1967, Pat. No. 3,538,329.

[52] U.S. Cl.........307/237, 250/83.3 R, 250/83.6 W, 328/100, 307/242

[51] Int. Cl...............G01t 1/17

[58] Field of Search..............307/237, 242, 243, 235; 328/100

[56] References Cited

UNITED STATES PATENTS

| | | | |
|---|---|---|---|
| 2,935,625 | 5/1960 | Schayes | 307/237 |
| 3,531,731 | 9/1970 | Matsuura et al. | 307/237 |
| 3,069,618 | 12/1962 | Pfaff | 307/237 |

*Primary Examiner*—James W. Lawrence
*Assistant Examiner*—Harold A. Dixon
*Attorney*—Robert W. Mayer, Daniel Rubin, Peter J. Murphy, Douglas M. Clarkson, Roy L. Van Winkle and William E. Johnson, Jr.

[57] ABSTRACT

A pair of transistors are connected in parallel with the emitters of the transistors connected to ground and the collectors connected together and to a common junction which in turn is connected through a resistor to an output terminal. A first input terminal is connected through an amplifier and a resistor to the common junction. The output of the amplifier is also connected through a diode to the base of the first transistor. The base is also connected through a resistor to a negative biasing voltage. The base of the second transistor is connected through a resistor to a negative biasing voltage. The base of the transistor is also connected through a diode to a second input terminal. The transistors are biased such that a signal appearing on the first input terminal is determinative of the amount of signal compensation appearing at the output terminal and a signal appearing at the second input terminal is determinative of the existence of the compensation.

1 Claim, 10 Drawing Figures

FRANCIS J. NIVEN, JR.
INVENTOR.
BY William E. Johnson, Jr.
ATTORNEY.

FRANCIS J. NIVEN, JR.
INVENTOR.

BY William E. Johnson Jr.
ATTORNEY.

FRANCIS J. NIVEN, JR.
INVENTOR.

BY William E. Johnson, Jr.
ATTORNEY.

FRANCIS J. NIVEN, JR.
INVENTOR.

BY William E. Johnson Jr.
ATTORNEY.

FRANCIS J. NIVEN, JR.
*INVENTOR.*

BY William E. Johnson, Jr.
*ATTORNEY.*

ELECTRICAL COMPENSATION CIRCUIT UTILIZING TWO TRANSISTORS CONNECTED IN PARALLEL

This is a division of application Ser. No. 684,849 now U.S. Pat. No. 3,538,329.

BACKGROUND OF THE INVENTION

This invention relates to systems for logging earth bore holes, and particularly to systems for determining the density of the formations surrounding earth bore holes. More particularly, it relates to a system providing compensation for the effects due to mud cake and bore hole non-uniformity upon the logging of the density of the formations surrounding a bore hole.

As is well known in the well logging art, there have been developed various bore hole instruments for logging the density of the formations surrounding a bore hole, some of such instruments having a gamma ray source and a pair of spaced radioactivity detectors, for example, a short-spaced detector and a long-spaced detector, as is described in the U.S. Pat. No. 2,469,461, issued on May 10, 1949 to W. L. Russell.

Even though there have been several such instruments having dual-spaced radioactivity detectors developed in an effort dual-spaced radioactivity detectors developed in an effort to provide compensation for the effects of mudcake and bore hole irregularities, such efforts have been hindered considerably by the lack of a compatible electronic system for use with the bore hole instrument.

It is therefore the primary object of this invention to provide an improved well logging system for determining the density characteristics of the formations surrounding a bore hole, wherein the determination is substantially independent of the mudcake and of the non-uniformity of the bore hole;

it is another object of the invention to provide an improved radioactivity counting rate meter circuit;

it is a further object of the invention to provide an improved compensator circuit; and it is still another object of the invention to provide an improved signal comparison circuit.

The objects of the invention are accomplished, broadly, by the provision of a pair of counting rate meter circuits which convert the pulse signals from the bore hole into analog voltages that are proportional to the counting rates of the long-spaced and short-spaced detectors, as well as the provision of means for receiving voltages from the bore hole which are representative of the diameter of the bore hole. The system compares the long-spaced signal with the caliper voltage, and makes the appropriate compensation to the long-spaced signal. Circuitry also transforms the long-spaced signal to a linear scale and compares the long-spaced signal with the short-spaced signal to correct the output of the surface electronics for the amount of either light or heavy mudcake, as is determined by the comparisons made within the system. An additional feature of the invention is the provision of a counting rate meter circuit to convert an input train of pulses from the bore hole into an analog signal whose amplitude is directly proportional to the input repetition rate. The counting rate meter circuit has means therein to offset the effects of noise which would otherwise be detrimental to the accuracy of the counting rate meter circuit.

The novel features of the present invention are set forth in the appended claims.

The present invention, both as to its organization and manner of operation, together with other objects, advantages, and features thereof, may best be understood by way of illustration and example when taken in conjunction with the accompanying drawings in which.

Figure 1:
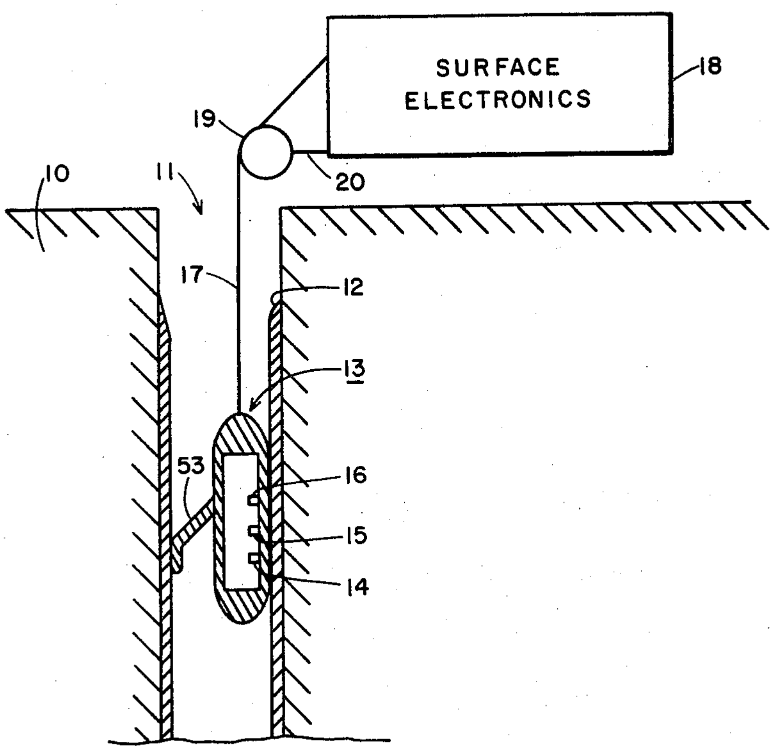
FIG. 1 is a side elevational view, partly in section, illustrating apparatus which may be used to carry out the invention, and the disposition of such apparatus relative to the strata to be examined.

Referring now to the drawings in detail, particularly to FIG. 1, there is illustrated schematically a density well logging operation in which a portion of the earth's surface 10 is shown in vertical section. An uncased well 11 penetrates the earth's surface 10. A mudcake layer 12, such as is found in some uncased wells, lines the wall of the well 11. Disposed within the well is subsurface instrument 13 of the well logging system. Subsurface instrument 13 comprises a gamma ray source 14, a short-spaced radioactivity detector 15, and a long-spaced radioactivity detector 16, both of the detectors being, for example, gamma ray detectors. Cable 17 suspends the instrument in the well and contains the required conductors for electrically connecting the instrument 13 with the surface apparatus and electronics 18. The cable is wound on, or unwound from, drum 19 in raising and lowering the instrument 13 to traverse the well during the logging thereof.

In making a density log of a well, instrument 13 is caused to traverse the well. Thereby, gamma rays from the source 14 are directed into the formations surrounding the well. At fixed distances from the source 14, the short-spaced detector 15 and long-spaced detector 16 detect changes in the intensity of the gamma ray beam resulting from changes in the bulk density of the formations, the intensity of gamma radiation at the detectors being a function of the density. The resulting signals from the detectors 15 and 16 are then transmitted along the cable 17 to the surface electronics 18. A recorder within the surface electronics 18 is driven by the transmission line 20 in synchronism with the movement of the cable 17 over the drum 19. The elements are shown diagrammatically, and it is to be understood that the associated circuits and power supplies are provided in the conventional manner. It is also to be understood that the instrument housing for the instrument 13 is constructed to withstand the pressures and mechanical and thermal abuses encountered in logging a deep well and provides adequate space within it to house the necessary apparatus and to permit the transmission of radiation therethrough.

Figure 2:
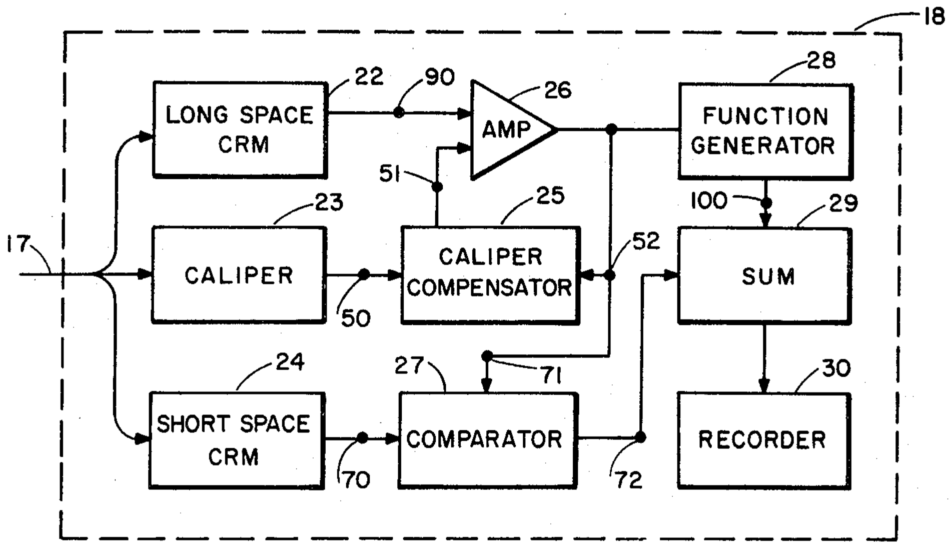
FIG. 2 is a block diagram of the surface electronics according to the invention.

FIG. 2 illustrates a block diagram of the surface electronics 18. The cable 17, for example a multiple conductor cable well known in the art, is connected into the long-spaced counting rate meter circuit 22, the caliper circuit 23, and the short-spaced counting rate meter circuit 24. The output of the caliper circuit 23 is coupled into a caliper compensator circuit 25, the output of which is coupled into the amplifier circuit 26. The output of the counting rate meter circuit 22 is also coupled into the amplifier circuit 26. The output of amplifier circuit 26 feeds back into the caliper compensator circuit 25, as will be described hereinafter with regard to FIG. 4. The output of amplifier circuit 26 also is coupled into the comparator circuit 27, along with the output of the short-spaced counting rate meter circuit 24, as will be described hereinafter with regard to FIG. 5.

The output from the amplifier 26 is also coupled into the function generator circuit 28, which may be, for example, a conventional diode-resistor function generator matrix. The outputs of the comparator circuit 27 and the function generator circuit 28 are coupled into a summing circuit 29, as will be described hereinafter with regard to FIG. 7. The output of the summing circuit 29 is coupled into a recorder 30, for example, a conventional galvanometer recorder.

Figure 3:
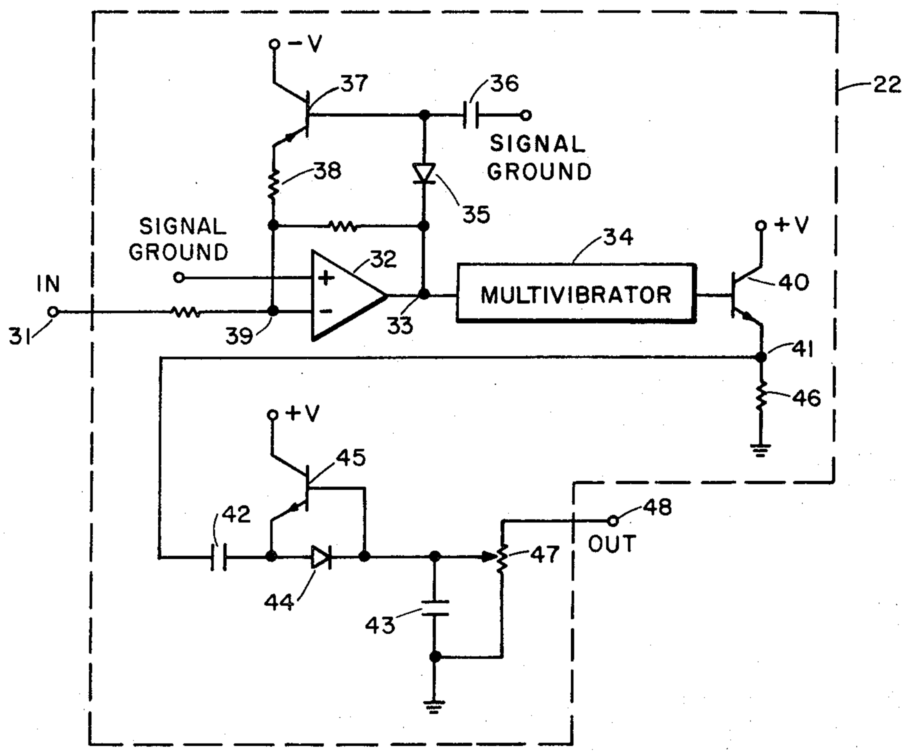
FIG. 3 is a schematic diagram of a counting rate meter circuit according to the invention.

FIG. 3 illustrates a counting rate meter circuit according to the present invention, for example, the counting rate meter circuits 22 and 24 of FIG. 2. The input terminal 31, taken from the cable 17 of FIG. 1, couples positive-going pulses into the inverting input of the operational amplifier 32, the gain of the amplifier being set at approximately 50. The negative going output pulses at terminal 33 are coupled into the multivibrator circuit 34, the multivibrator circuit gating level being set to be triggered on at a minimum amplitude of approximately −1 volt from ground level. The multivibrator circuit 34 can be a conventional one-shot configuration. At approximately −1 volt on the terminal 33, the diode 35 also conducts, thereby charging capacitor 36. The relatively small charge on the capacitor 36 is drained by the base of the transistor 37 and amplified through the emitter of the transistor 37, then being coupled through the resistor 38 back to the inverting terminal of amplifier 32. The non-inverting terminal, identified as the positive terminal of the amplifier 32, is connected to signal ground. Thus, a pulse train appearing on terminal 31 causes an analog voltage to appear on the capacitor 36 of amplitude proportional to pulse amplitude. From resistor 38 the current biases the summing junction 39 in a negative direction, thereby opposing the positive input pulses. The output appearing at terminal 33 then indicates the pulse base line rising in a positive direction, thereby raising noise voltages away from the trigger level of the one-shot multivibrator circuit 34. It should be appreciated that the transistor 37 could be replaced by other conventional amplifiers.

The output of multivibrator circuit 34 is coupled into the base of transistor 40, the transistor 40 being connected in an emitter follower configuration. The pulse appearing at terminal 41 is nominally set at +10 volts, thus charging capacitors 42 and 43, most of the voltage being dropped across capacitor 42. Diode 44 conducts during the rise time of the pulse and turns off after capacitor 42 is fully charged. The transistor 45 equalizes the voltage on either side of the diode 44 by allowing current to flow from the positive collector voltage of transistor 45 into the junction of capacitor 42 and diode 44 when the driving pulse falls to zero. The fall time of the pulse at the emitter of transistor 40 is the capacitor 42 discharging through resistor 46 to ground. The charge on capacitor 43 is drained by the variable resistor 47, the setting of the resistor 47 providing a sensitivity control for the counting rate meter circuit. Since the charge across capacitor 43 is maintained at a constant level for a single input repetition rate occurring at terminal 31, the circuit may be considered a constant current source. The analog voltage across capacitor 43 is coupled into the output terminal 48 which may be monitored, for example, by an operational amplifier (not illustrated) connected as a variable gain follower if desired. It has been found that such a counting rate meter circuit counts positive-going pulses from 20 mv. to 600 mv. amplitude and rejects noise with a voltage less than 50 percent of the signal voltage at repetition rates greater than one per second.

Figure 4:
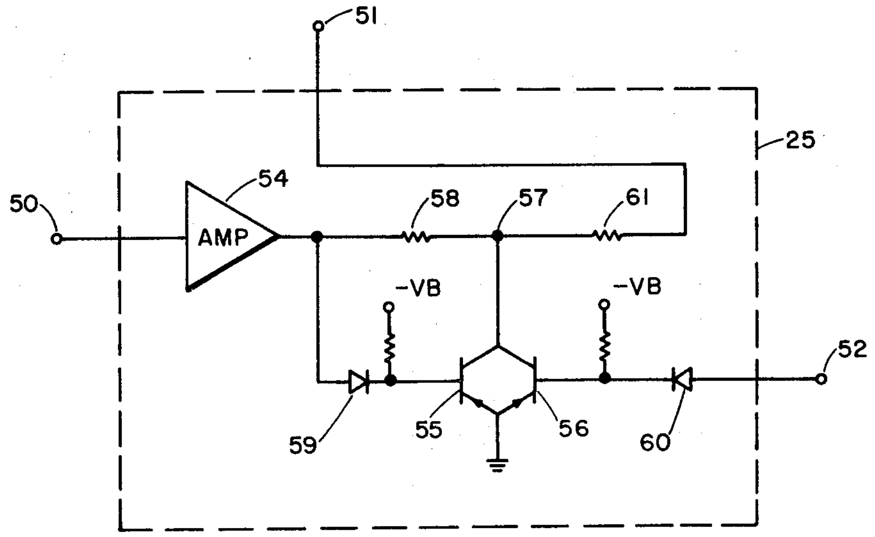
FIG. 4 is a schematic diagram of a caliper compensator circuit according to the invention.

FIG. 4 illustrates the caliper compensator circuit 25 as shown in block diagram in FIG. 2. Terminal 50, coming from the conventional caliper instrument 53 in the bore hole, is connected into amplifier 54. A pair of PNP transistors 55 and 56 are connected in parallel, the emitters being connected to ground and the collectors being connected to the terminal 57. The positive going output of amplifier 54 is connected to terminal 57 through the resistor 58. The output of amplifier 54 is also connected through a level-shifting diode 59 to the base of the transistor 55. As the output from amplifier 54 goes more positive, indicating that the bore hole has become larger, the transistor 55 goes from a highly conductive state to a less conductive one and then to another highly conductive state, the latter being achieved when the emitter-base junction of transistor 55 is completely cut off and the collector-base junction is fully forward biased. It should be appreciated that as either of the transistors 55 and 56 become more conductive, the point 57 comes closer to ground potential. The terminal 52, being connected to the output of the amplifier circuit 26, is coupled through diode 60 into the base of transistor 56. Although not illustrated, terminal 52 is normally biased positive. Since caliper compensation is normally required only for the heavier formation densities, transistor 56 is thus operated by a biased inverse of the long-spaced signal, the signal appearing at terminal 52 being a function of the long-spaced signal. Thus as the signal at terminal 52 increases the transistor 56 becomes less conductive and terminal 57 is further removed from ground potential. Thus the positive bias appearing at terminal 52 sets the point at which compensation should commence. The level of signal at terminal 52, after overcoming the bias, controls the conductivity of transistor 56 in a similar fashion as the transistor 55 is controlled by the output of amplifier 54. The net effect of the combination of the two transistors and the inputs thereto is a rotation of the function line, or merely a translation if the cutoff point is biased far enough away so that the collector-base junction of transistor 55 can become fully forward biased. Thus it should be appreciated that as the signal from the amplifier 54 is coupled through the resistor 58 to the junction 57, it is attenuated to the desired amount by the action of the transistors 55 and 56 and then coupled through the resistor 61 to the terminal 51, thus providing a means of compensating for the caliper and long-spaced detector signals received from cable 17.

Figure 5:
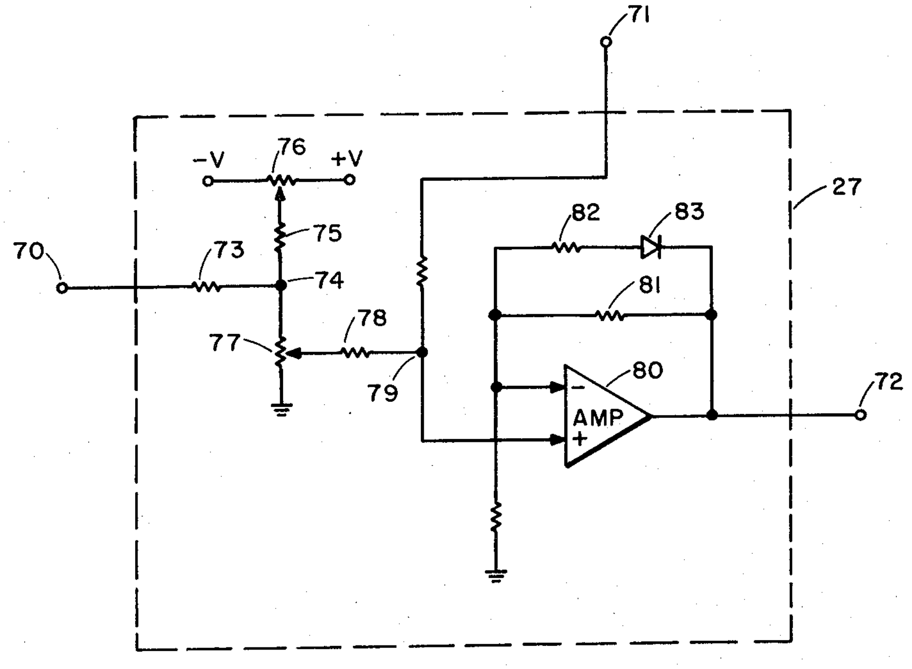
FIG. 5 is a schematic diagram of a comparator circuit according to the invention.

FIG. 5 illustrates the comparator circuit 27 shown in block diagram in FIG. 2. The junction 70, being the output of the counting rate meter circuit 24, is coupled through resistor 73 to junction 74. Junction 74 is connected through resistor 75 to the variable resistor 76, the ends of which are connected respectively to a negative and positive voltage. Junction 74 is also connected through variable resistor 77 to ground and through resistor 78 to junction 79. Junction 79 is connected to the non-inverting input of amplifier 80, whereas the inverting input of amplifier 80 is connected to ground. The output of amplifier 80 has a pair of feedback paths, one being through resistor 81, the other being through resistor 82 and diode 83. The feedback paths are established between the output of amplifier 80 and the inverting or negative input of amplifier 80. The output of amplifier 80 is also connected to terminal 72, which in turn is connected into the summing circuit 29 illustrated in block diagram in FIG. 2. Terminal 79 is also connected to terminal 71, which in turn is connected to the output of amplifier 26 in FIG. 2. It should be appreciated in the operation of the circuitry of FIG. 5 that the short-spaced signal will appear at terminal 70 and the long-spaced signal will appear at terminal 71, thus causing terminal 79 to be a summing junction of the long and short-spaced signals. As will be explained hereinafter with regard to FIG. 6, the signal appearing at junction 71 is negative going, whereas the signal at terminal 70 is positive going. Thus, with equal signals of opposite magnitude appearing at junction 79, the sum voltage upon that terminal will be zero, thereby calibrating the short-spaced signal to the long-spaced signal. In the event of a light-weight mudcake during the logging of the well, the long-spaced comparison signal will increase more negatively and the short-spaced signal will increase positively by an amount out of proportion to a no-mud-cake signal. This results in the summing junction 79 going positive, this voltage then being amplified by amplifier 80 by the factor as determined by the resistor 81. It should be appreciated that when the output from the amplifier 80 is positive, diode 83 does not conduct and the feedback route passes through resistor 81, whereas when the output from amplifier 80 is negative, diode 83 does conduct and the feedback loop is comprised of resistors 82 and 81 in parallel. Thus it should be appreciated that as the signal from the long-spaced detector is greater than the signal from the short-spaced detector, the signal appearing at junction 79 is more negative and the output at junction 72 will be a negative going signal, whereas the signal at junction 72 will be a positive going signal whenever the short-spaced signal at 79 is greater than the long-spaced signal at that point. Junction 72 is coupled into the summing circuit 29 of FIG. 2, but can be more readily appreciated from the descriptions given hereinafter with regard to FIG. 7.

Figure 6:
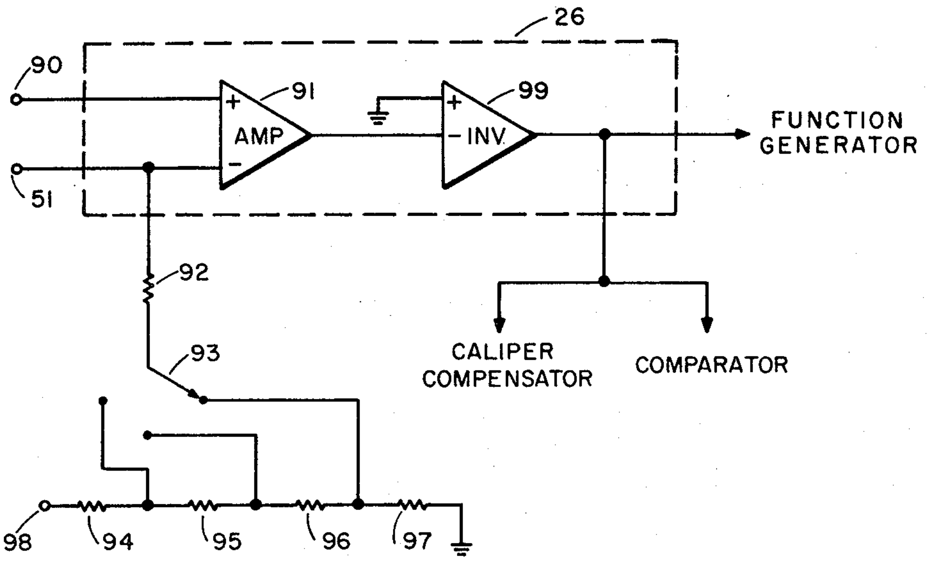
FIG. 6 is a schematic diagram of an amplifier circuit according to the invention.

FIG. 6 illustrates in greater detail the amplifier 26 as shown in block diagram in FIG. 2. The voltage appearing at junction 90, being indicative of the long-spaced signal from the counting rate meter circuit 22, is coupled into the positive input of amplifier 91, whereas the terminal 51 from the caliper compensator circuit 25 of FIG. 4 is coupled into the negative input of amplifier 91. Terminal 51 is also connected through resistor 92 to a mud-weight switch 93 which can be used to vary the bias appearing on terminal 51 as desired by the operator from a knowledge of the weight of the mud within the bore hole. Within the switching arrangement 93 are found a series of resistors 94, 95, 96 and 97 which are connected between a voltage at junction 98 and ground. The output of amplifier 91 is connected to the inverting input of amplifier 99, the positive input of amplifier 99 being grounded. As can also be seen from FIG. 2, the output of the amplifier 26, being at the output of amplifier 99, is coupled into the function generator, the caliper compensator, and the comparator circuits.

Figure 7:
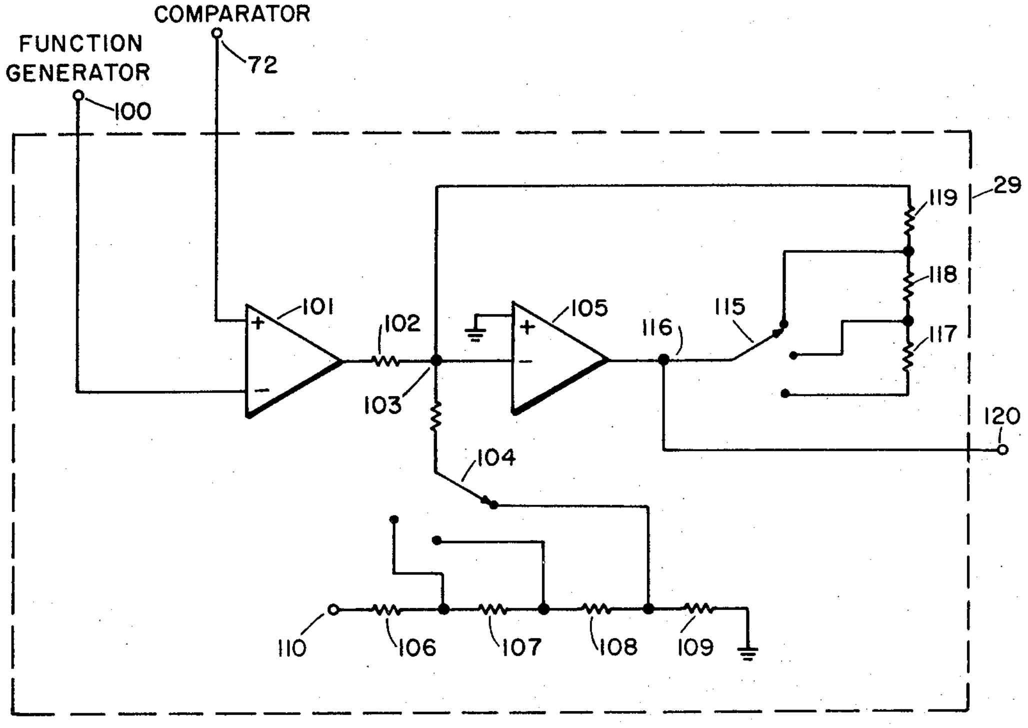
FIG. 7 is a schematic diagram of a summing circuit according to the invention; and, FIG. 8 illustrates various wave forms in the circuitry according to the invention.

FIG. 7 illustrates in greater detail the summing circuit 29 illustrated in block diagram in FIG. 2. The function generator output, illustrated as junction 100, is coupled into the negative input of amplifier 101, whereas the comparator circuit from junction 72 is coupled into the positive input of amplifier 101. The output of amplifier 101 is coupled through resistor 102 to terminal 103, terminal 103 being connected to a mud-weight switch 104 and also to the negative input of amplifier 105. The mud-weight switch 104 is connected in a like manner as is mud-weight switch 93 in FIG. 6 across a series of resistors 106, 107, 108 and 109, the series of resistors being connected between a voltage source at terminal 110 and ground. As is the case with the mud-weight switch 93, the mud-weight switch 104 can be used to affect the bias on the negative input terminal of 105 as dictated to the operator by the weight of the mud within the well being logged. Likewise, a third mud-weight switch 115 is connected to the output terminal 116 of amplifier 105 to affect the feedback characteristics of amplifier 105 by switching the resistors 117, 118 and 119 back to terminal 103. Output terminal 116 is also connected to the system output terminal 120, which in turn can be connected to the recorder 30 illustrated in block diagram in FIG. 2.

It should be appreciated that in terms of linearizing the functions within the system here embodied, the mud-weight switch 93 and the mud-weight switch 104 can be used to affect the amount of translation, while the mud-weight switch 115 can be used to affect the amount of rotation of the function lines.

Although the embodiments herein described and illustrated indicate that the summing step as performed within the circuit 29 should be performed after the function generator, it should be appreciated that the summing operation can likewise be performed either within or before the function generator circuit 28.

Figure 8A:
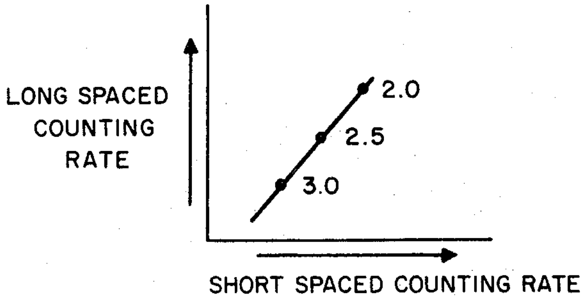
Figure 8B:
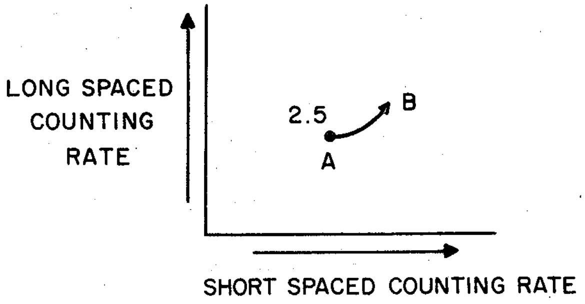
Figure 8C:
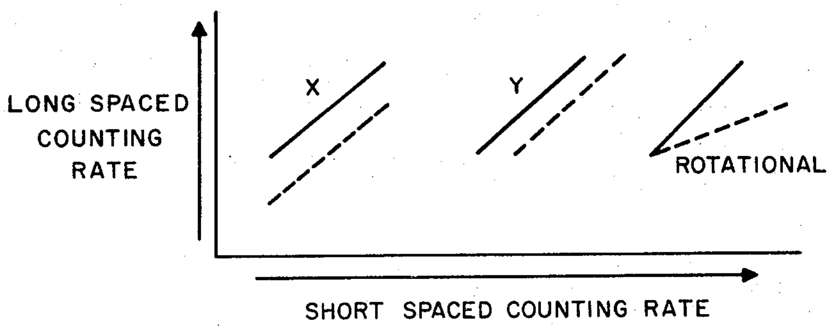

FIG. 8 schematically represents electrical wave forms and data computations which are typical of those encountered in density well logging, as well as those found within the circuitry according to the present invention. FIG. 8(*a*) illustrates a representative plot of the long-spaced signals versus the short-spaced signals counting rate, the density of the formation being an inverse function of both counting rates. Such a plot is typical for formations surrounding a borehole wherein either no mudcake or a negligible mudcake is present.

It should be appreciated that the density of formations generally encountered in the well logging art varies between 2.0 and 3.0 grams per c.c., some of the commonly found minerals in sedimentary rocks being calcite with a density of 2.71 grams per c.c., dolomite with a density of 2.8 – 2.9 grams per c.c., and gypsum with a density of 2.314 – 2.328 grams per c.c. It should also be appreciated that the average density of kaolinite, one of the common clay minerals, has a density of 2.6 – 2.63 grams per c.c., as compared with quartz, having a density of 2.653 – 2.660 grams per c.c., thus making density logging especially useful in obtaining porosity values in shaly sands.

FIG. 8(*b*) illustrates the manner in which a point on the density line of FIG. 8(*a*) deviates from the normal in a system having no compensation for the effect of a change in mudcake thickness. Point A represents zero mudcake thickness, whereas the curved line between points A and B indicates an increasing mudcake thickness from point A to point B. The system according to the present invention provides means for eliminating or reducing substantially such a deviation from the normal, thus effectively eliminating the effects of the mudcake thickness. Although FIG. 8(*b*) is the only illustration of the density plot deviating from the normal, it should be appreciated that factors such as a change in mudcake thickness or a change in mudcake density, occurring separately or together, can cause the plot of density to either be translated or rotated and that the system according to the present invention compensates for such deviations.

FIG. 8(*c*) illustrates the effect of a "Y" translation, an "X" translation and a rotation of a linearized density plot according to the present invention. It should be appreciated that the terms "X" and "Y" are arbitrary and could be reversed if desired to correspond to the conventional "X" and "Y" axes.

Referring again to the diagram of FIG. 2, it should be appreciated that the cable 17 delivers voltages, usually pulsed, to the surface electronics 18 which are proportional to the counting rates of the long-spaced and short-spaced detectors, and also a voltage proportional to the diameter of the bore hole. The caliper compensator circuit 25 determines both the amount of compensation to be applied to the long-spaced signal and also the point at which compensation is to commence. The analog signal from the short-spaced counting rate meter 24 is compared with the inverse of the long-spaced counting rate meter signal in the comparator circuit 27. The function generator circuit 28 linearizes the long-spaced signal from the amplifier 26, the output of the function generator then being summed with the output of the comparator 27 to provide a signal to the recorder 30 which has been compensated both for changes in mudcake thickness and mudcake density. It is to be understood, that although not illustrated and described, those skilled in the art can modify the system described and illustrated herein with such features as zero corrections, voltage bucking circuits and sensitivity controls without effecting the inventive concepts described herein.

It should also be appreciated, that although not illustrated and described as such, the mud-weight selector switches 93, 104 and 115 illustrated in FIGS. 6 and 7 can be gang-switched, if desired.

While there have been described herein the preferred embodiments of the invention, it is to be understood that many modifications and changes can be made therefrom without departing from the spirit of the invention, and it is desired, therefore, to limit the scope of the invention only as set forth in the appended claims.

The embodiments of the invention in which an exclusive property or privilege is claimed are defined as follows:

1. A compensator circuit comprising:

a. a first input terminal for receiving varying first input signals;

b. a first transistor and a second transistor, the emitters of said transistors being connected to each other and the collectors of said transistors being connected to each other, said collectors being also connected to an output terminal, said first input terminal being connected to the base of said first transistor;

c. a resistor connected between said first terminal and said output terminal; and d. a second input terminal for receiving varying second input signals, wherein said first varying signals are different from said second varying signals, connected to the base of said second transistor, said transistors being biased such that a signal appearing at said first input terminal is determinative of the amount of signal compensation appearing at the output terminal and a signal appearing at said second input terminal is determinative of the existence of said compensation.

* * * * *

PO-1050
(5/69)

UNITED STATES PATENT OFFICE
CERTIFICATE OF CORRECTION

Patent No. 3,693,029 Dated September 19, 1972

Inventor(s) Francis J. Niven, Jr.

It is certified that error appears in the above-identified patent and that said Letters Patent are hereby corrected as shown below:

Assignee: Dresser Industries, Inc.
Dallas, Texas

Signed and sealed this 3rd day of April 1973.

(SEAL)
Attest:

EDWARD M.FLETCHER,JR.
Attesting Officer

ROBERT GOTTSCHALK
Commissioner of Patents